No. 887,960. PATENTED MAY 19, 1908.
C. J. ORSTRUM.
STORAGE DEVICE FOR SEED CORN.
APPLICATION FILED FEB. 25, 1908.

*Fig. 2.* *Fig. 3.*

Witnesses Inventor
C. J. Orstrum,
By Beeler & Robb
Attorneys

UNITED STATES PATENT OFFICE.

CARL J. ORSTRUM, OF CAMBRIDGE, ILLINOIS.

STORAGE DEVICE FOR SEED-CORN.

No. 887,960.           Specification of Letters Patent.         Patented May 19, 1908.

Application filed February 25, 1908. Serial No. 417,729.

*To all whom it may concern:*

Be it known that I, CARL J. ORSTRUM, a citizen of the United States, residing at Cambridge, in the county of Henry and State of Illinois, have invented certain new and useful Improvements in Storage Devices for Seed-Corn, of which the following is a specification.

This invention relates to storage means for corn, and especially to apparatus for the purpose of receiving, transporting, curing, and preserving seed corn in the ear.

The selection and treatment of seed corn is, for the average farmer, one of the most vital problems with which he has to deal, particularly in the colder climates. To secure the best selection of ears, it is essential that the farmer shall note the character of the location, the stalk, and the general appearance of the ear as it has grown, and hence it is that the most careful farmer always prefers to select his seed corn while husking in the field. Ordinarily seed ears, thus selected, are left with a portion of the husk attached and the ears by this means are collected in bunches to be hung away, but whatever husk is left upon an ear will always interfere with the proper drying of the cob, and furthermore much of the corn thus bunched is lost by breakage of the husk hangers or by being exposed to the action of rats and mice. Again, if the ears are properly husked clean they are usually either put away in bulk and hence not thoroughly cured and also subject to waste by vermin or else they may be tied up by wires or cords, in either event entailing much labor by numerous handling and loss of time.

For a full understanding of the invention, reference is to be had to the following drawings, in which,—

Figure 1:
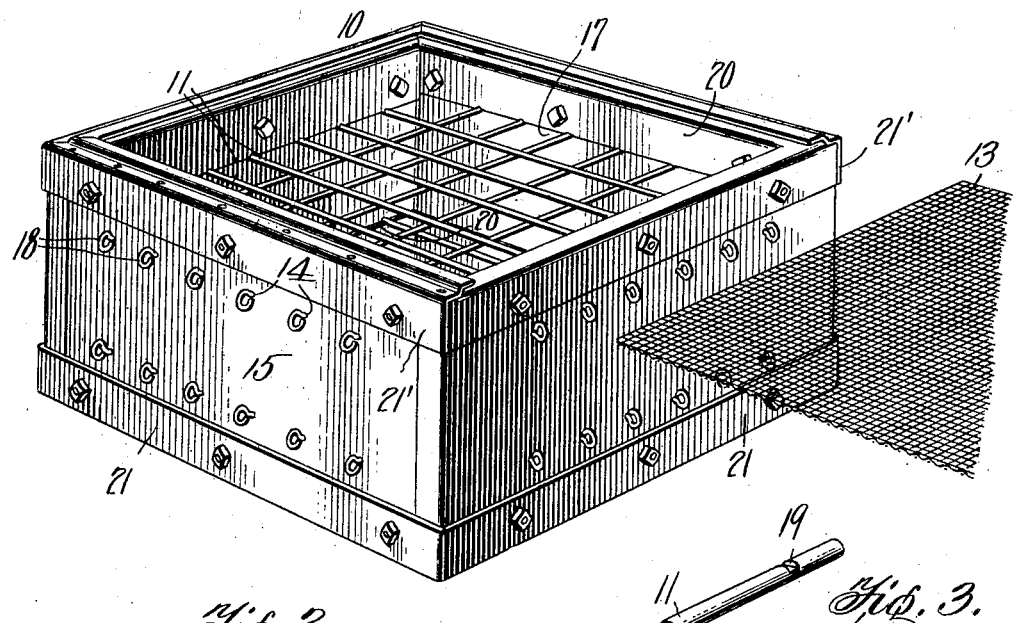
Figure 1:
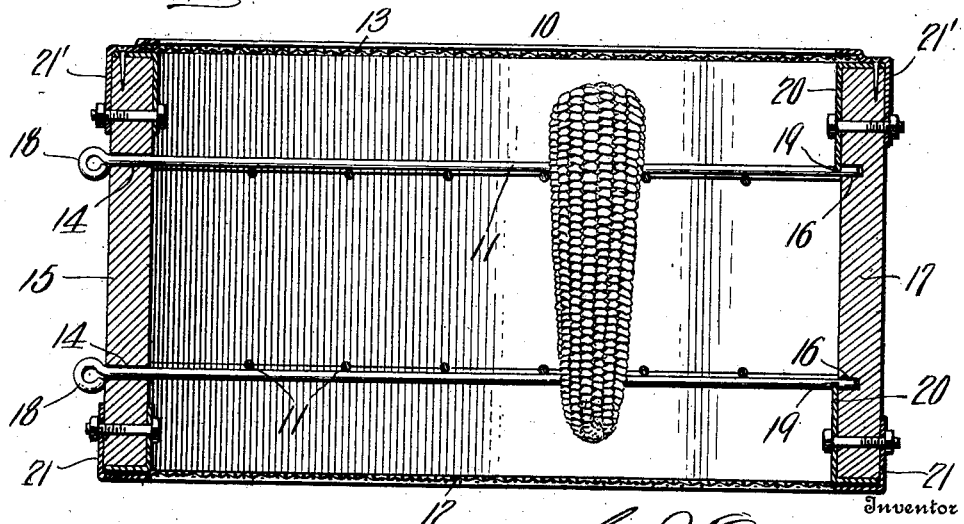

Figure 1 is a perspective view of the device, with the cover open; Fig. 2 is a vertical sectional view, and Fig. 3 is a detail of the locking end of one of the bars.

Throughout the following description and on the several figures of the drawings similar parts are indicated by the same reference characters.

By my apparatus I am able to secure all the advantages of field selection and perfect husking, and at the same time provide for the most thorough curing and safe keeping of the corn, with the least possible amount of handling of the same. More specifically stated my invention consists of a structure which the farmer will take with him to the corn field, carrying the same on any convenient part of his wagon. The structure comprises a frame 10 of any suitable size and form and provided with a plurality of sets of strong transverse rods 11, the rods crossing one another and forming a number of vertical pockets or cavities each to receive a single ear of corn. As an illustration of a convenient form and size I provide a square frame of any suitable material, open at top and bottom and just large enough to accommodate seven ears each way, or forty-nine altogether, approximately a half bushel of corn. The bottom of the frame is permanently closed by a section of strong wire gauze 12, and the top is adapted to be closed by a slidable piece 13, of similar material after filling.

In the preferred embodiment of the invention, each rod 11, is passed through a hole 14, in a side 15 and its inner end is seated in a socket 16 of a side 17 opposite the side 15. The outer end of the rod has a head 18 lying against the outer surface of the side 15 and the inner end is notched at 19 adjacent to the inner surface of the side 17. Angle plates 20 project into said rod notches and are secured to the edges of the frame, thereby positively preventing the weight of the corn from displacing the rods in either direction. Angle irons 21 at the bottom of the frame serve to hold the gauze 12 in place, and further reinforce the edges of the frame. Other angle plates 21' at the top provide flanges to receive the slidable gauze 13.

Each choice ear of corn, when discovered, will be thoroughly husked and dropped into a pocket, as indicated. When the device is filled it will be closed by the top 13 and set away in the sun to dry, a free circulation of air between the ears being insured by the separating rods 11 and the open top and bottom, and yet the corn will be protected from poultry or loss by vermin. After drying, the device loaded with corn will be set away in any convenient place protected from injury by severe weather until testing time in the spring. The devices, obviously, may be used year after year.

I claim:

1. A corn storage device comprising a frame, a plurality of sets of cross rods secured in said frame, angle plates to strengthen the edges of the frame and secured thereto, a permanent gauze closure for the bottom of the frame and secured by certain of said angle plates, and a slidable gauze closure for the top held by other of said angle plates.

2. A corn storage device comprising a frame having open top and bottom, gauze closures for the top and bottom, angle plates to secure the said closures in place, sets of intermediate cross rods dividing the interior of the frame into ear receiving pockets, each rod being passed through one side of the frame into the opposite side and being notched near its inner end, one of said angle plates entering said notch to secure said rod in place, and means to secure all of said angle plates in position.

In testimony whereof I affix my signature in presence of two witnesses.

CARL J. ORSTRUM.

Witnesses:
  G. G. JOHNSON,
  J. E. OBERG.